United States Patent [19]
Wyatt et al.

[11] 3,862,732
[45] Jan. 28, 1975

[54] COMBINED FLUID FLYWHEEL AND PROPULSION SYSTEM FOR SPACECRAFT

[75] Inventors: Theodore Wyatt, Union Bridge; Charles J. Swet, Mount Airy, both of Md.

[73] Assignee: The United States of America as represented by the Secretary of the Navy, Washington, D.C.

[22] Filed: Aug. 7, 1973

[21] Appl. No.: 386,469

[52] U.S. Cl. ................. 244/165, 74/57, 244/172
[51] Int. Cl. ............................................. B64g 1/20
[58] Field of Search ......... 244/1 SA, 1 SS, 1 SB, 79, 244/3.14, 3.22, 164, 172, 165, 169; 73/504; 74/57

[56] References Cited
UNITED STATES PATENTS

| | | | |
|---|---|---|---|
| 2,856,142 | 10/1958 | Haviland | 244/79 X |
| 2,953,925 | 9/1960 | Yeadon | 74/5.7 |
| 3,091,417 | 5/1963 | Miksch | 244/1 SA X |
| 3,097,480 | 7/1963 | Sohn | 244/1 SB X |
| 3,097,818 | 7/1963 | Heller | 244/1 SA X |
| 3,200,748 | 8/1965 | Macatician | 244/79 X |
| 3,231,223 | 1/1966 | Upper | 244/1 SA X |
| 3,371,541 | 3/1968 | Herman | 74/5 |
| 3,423,613 | 1/1969 | Davis | 244/1 SA X |
| 3,446,023 | 5/1969 | Mosier | 244/3.22 X |
| 3,730,457 | 5/1973 | Williams | 244/1 SA |

Primary Examiner—Trygve M. Blix
Assistant Examiner—Barry L. Kelmachter
Attorney, Agent, or Firm—R. S. Sciascia; Q. E. Hodges

[57] ABSTRACT

A device for use in a spacecraft which combines propulsion fluid storage and flywheel yaw axis stabilization into a single mechanism. It consists of one or more rotating toroidal tanks connected to nozzles through connecting plumbing and valves. The rotating tank contains a supply of propulsion fluid in its liquid and vapor phases. The tank is pressurized by heat from any convenient source, such as incident solar energy. As an alternative to rotation of the tank and its contents, an electrically conductive liquid may be rotated with respect to a stationary tank by electromagnetic pumping. By either form of rotation, a flywheel is produced which performs yaw axis stabilization of a spacecraft. Since centrifugal force causes the liquid and vapor phases to be distributed in a predictable manner within the rotating tank, the vapor, which is the desired phase of the fluid for propulsion, can be selectively drawn off and expelled through the nozzles to provide propulsive forces for attitude or minor orbital corrections. Improvement in the specific impulse of the propulsion fluid can be accomplished by electrolytic decomposition of the fluid so as to reduce the average molecular weight of the gas discharged from the nozzles. Further improvement in specific impulse can be attained by causing the products of decomposition to recombine exothermally so as to increase the temperature of the gas discharged from the nozzles.

9 Claims, 15 Drawing Figures

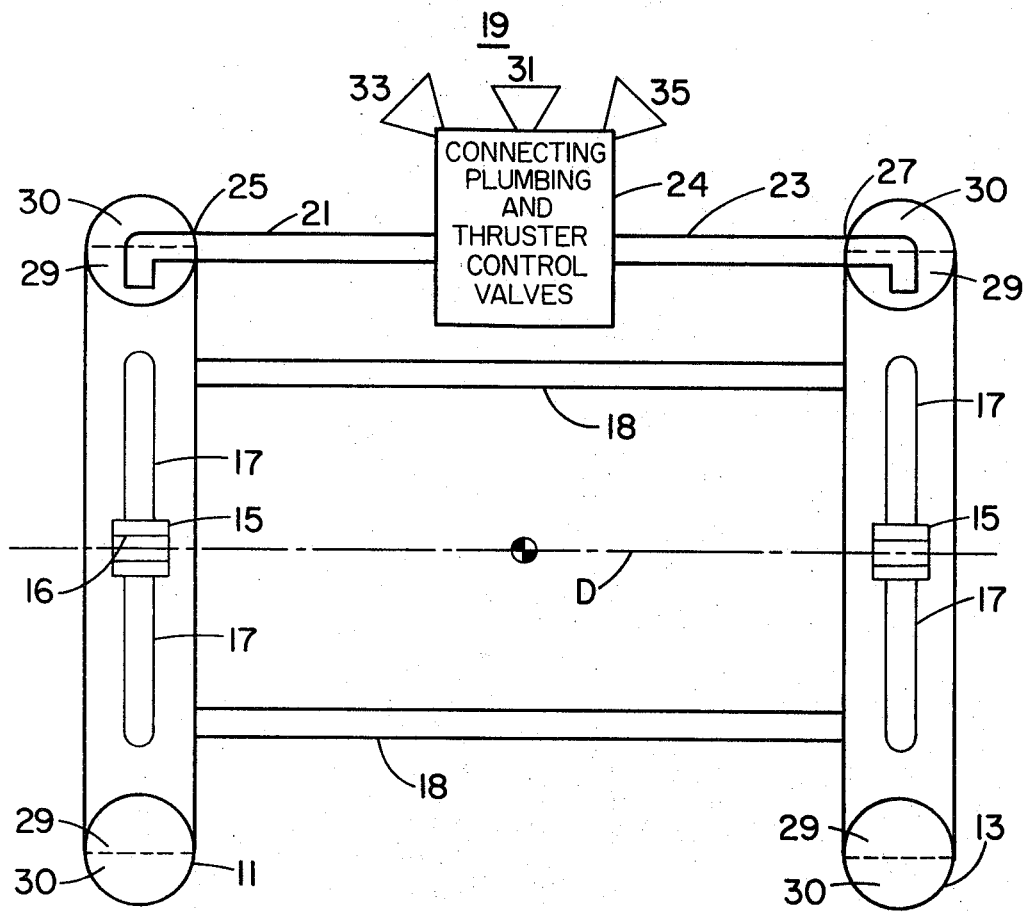
FIGURE IA 3,862,732

COMBINED FLUID FLYWHEEL AND PROPULSION SYSTEM FOR SPACECRAFT

The invention described herein may be manufactured and used by or for the Government of the United States of America for governmental purposes without the payment of any royalties thereon or therefor.

BACKGROUND OF THE INVENTION

The invention relates generally to satellite yaw stabilization and satellite propulsion fluid storage, and more specifically to means for combining these two functions into a single mechanism.

Weight reduction is an incessant problem in spacecraft systems. Generally speaking, anytime two or more independent systems, which perform respective independent functions, can be combined into a single system or mechanism the weight problem can usually be diminished.

In the past, high pressure gas storage tanks have been utilized for storing satellite propulsion fluid. An independent system was provided for yaw stabilization, typically a flywheel. This invention combines the function of yaw stabilization and propulsion fluid storage into a single mechanism to thereby save weight and with the additional advantage of permitting the use of higher overall specific impulse propellant than could otherwise be used as in the high pressure gas storage tanks of the prior art.

SUMMARY OF THE INVENTION

Accordingly, it is an object of this invention to provide a satellite yaw stabilization system and a propulsion fluid source of high specific impulse within a single system, thereby minimizing weight and structural requirements.

Briefly, the invention includes toroidal tanks containing a fluid in its liquid and vapor phases. The tanks are rotated so as to constitute a fluid flywheel and also to distribute the propulsive fluid within the tanks in a predictable manner, due to centrifugal forces, permitting the selective withdrawal of the vapor for discharge through propulsion jets.

In one application the force vectors of the propulsion jets are arranged to intersect the center of mass of the satellite so as to produce motion, by either single or combined operation of the jets in any direction, in response to command control signals. The use of jets attached to the rotating assembly and operated at the proper phase angle of rotation provides the generation of motion in any direction with a lesser number of jets than would be required if attached to non-rotating structure and also avoids the necessity for leak-proof connections between rotating and nonrotating elements. Several embodiments of feasible jet configurations are shown in the drawing. The specific cluster arrangement preferable in a particular application is a function of the geometry of the spacecraft configuration, the orbital height and the orbital inclination.

The yaw stabilization and fluid supply design of the invention permits a spacecraft placed in orbit about the earth or in space flight remote from the earth to have a relatively lengthy operative life, such as for several years. This is due to the fact that the jet working fluid is predominantly in the liquid phase at the start of life, providing a more efficient system as the overall specific impulse of a liquid used in its vapor form and the associated tanks is greater than that of stored high-pressure gas and tanks. Additionally, a weight saving is afforded by utilizing the rotating toroidal tanks as a yaw stabilization force, rather than providing a separate flywheel for this sole purpose. The performance of two functions by one structure provides a weight saving in the satellite which is a significant advantage over prior art.

An example of the manner in which the life of the satellite can be extended because the propulsion material is stored in a liquid phase is the following. A liquid-vapor ammonia system weighing eight pounds will provide about 1,000 lb-sec. of impulse while a "Freon" highpressure gas system weighing the same eight pounds produces only 135 lb-sec. Thus the stored liquid system provides about seven times the life of a stored gas system of the same weight, as well as eliminating a separate flywheel which would weigh another one or two pounds.

This improvement in the effectiveness of propellant material stored in the liquid phase is dependent, of course, on the ready availability of heat for the conversion of the liquid phase into the vapor phase and the selective withdrawal of the vapor for propulsion. The evaporation of 2 gm of ammonia, which slightly exceeds the daily rate of consumption in a representative satellite, requires 600 calories. Considering that the solar constant is 2,880 calories per square cm per day and that a near-earth satellite is sun-lit over 50 percent of the time, it is seen that the provision of the amount of heat required for liquid vaporization by solar heat absorbed by the walls of the tank can be readily accomplished.

Various other objects and advantages will appear from the following description of various embodiments of the invention, and the novel features will be particularly pointed out hereinafter in connection with the appended claims.

BRIEF DESCRIPTION OF THE DRAWINGS

FIG. 1A is a sectional view of one embodiment of the invention.

DESCRIPTION OF THE INVENTION

Figure 1B:
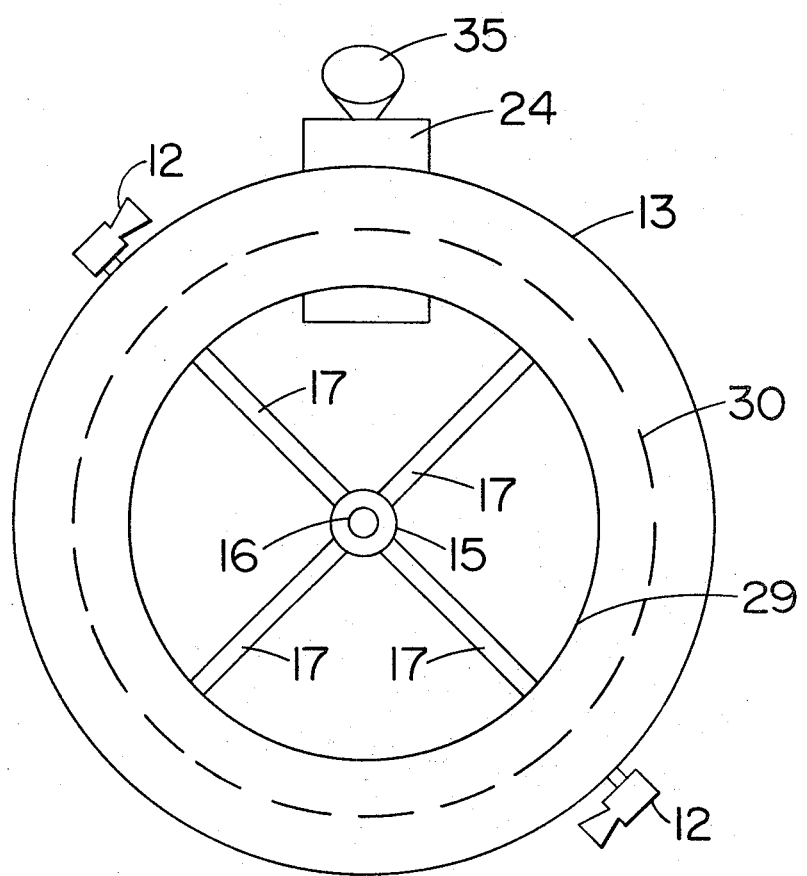
FIG. 1B is a side view of the embodiment in FIG. 1A.

Referring now to FIGS. 1A and 1B, the invention is shown according to a first embodiment. FIG. 1A is a sectional view while FIG. 1B is a side view. As shown in FIG. 1A, the invention has two toroidal tanks 11 and 13. The tanks are connected to hubs 15 by spokes 17 and rotate about fixed shafts (not shown). The tanks are secured in a fixed relationship to one another by struts 18. A nozzle cluster 19 is connected to each of the toroidal tanks by means of conduits 21 and 23 via connecting plumbing and thruster control valves 24 and rotates with the tanks. The conduits 21 and 23 project into each of the respective toroidal tanks at points 25 and 27, and each has a 90° bend so that the conduits' openings within the toroidal tanks are pointed toward the axis of rotation and extend to the inner radius of the toroidal tanks.

Rocket motors 12 drive the tanks about the axis D. As the tanks rotate the vapor phase 29 and liquid phase 30 of the propulsion fluid within the toroidal tanks are separated, with the denser liquid phase forced towards the outer radius and the vapor displaced toward the inner radius. The openings of each of the conduits 21 and 23 are at the inner radius of the toroidal tanks and within the vapor phase. The vapor is passed through the respective conduits through connecting plumbing and control valves 24 and emitted from respective jets 31, 33, 35 of nozzle cluster 19 under the control of a control system (to be described).

Although two toroidal tanks are shown the invention may be designed with one tank or a plurality of tanks. Stub shafts 16 extending into the hubs are provided for axially supporting the tanks and for establishing the axis of rotation. However, it is to be understood that other means of suspending and rotating the tanks may be used without departing from the spirit of the invention.

Figure 2A:
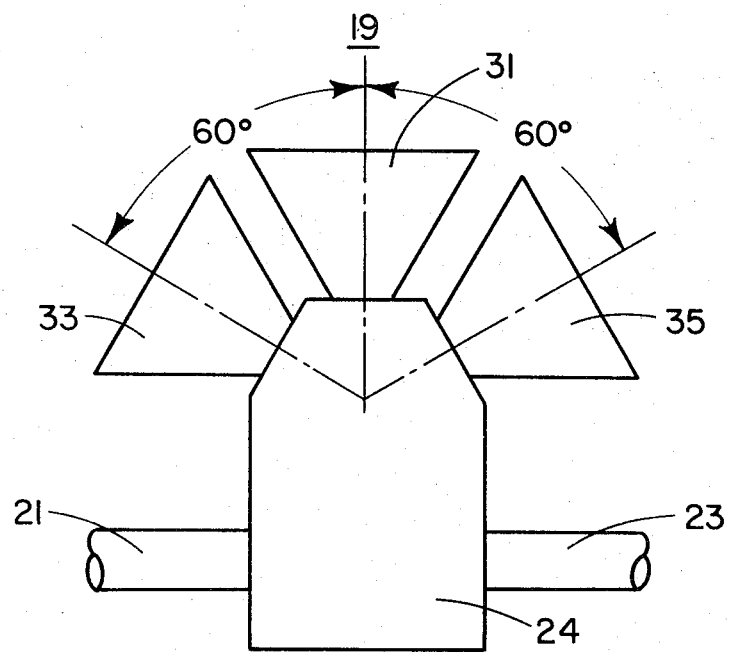
FIG. 2A shows one view of a first embodiment of a nozzle cluster having three nozzles arranged at 60° which may be employed in the invention.
Figure 2B:
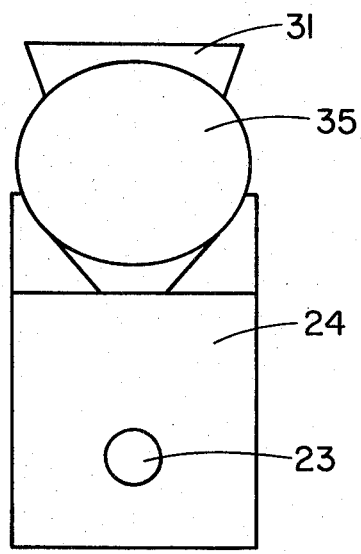
FIG. 2B shows another view of the nozzle cluster of FIG. 2A rotated by 90°.

As shown in FIGS. 2A and 2B, the nozzle cluster is shown as having three jets or nozzles arranged 60° apart. A first nozzle 31 is oriented so that its propulsive force is within the plane of rotation of the cluster and in a vector direction intersecting the axis of rotation of the tanks and the center of mass of the spacecraft. The other two nozzles 33 and 35 are each separated from nozzle 31 by an angle of 60°, the propulsive forces of all three nozzles being in the plane perpendicular to the direction of rotation.

Figure 3A:
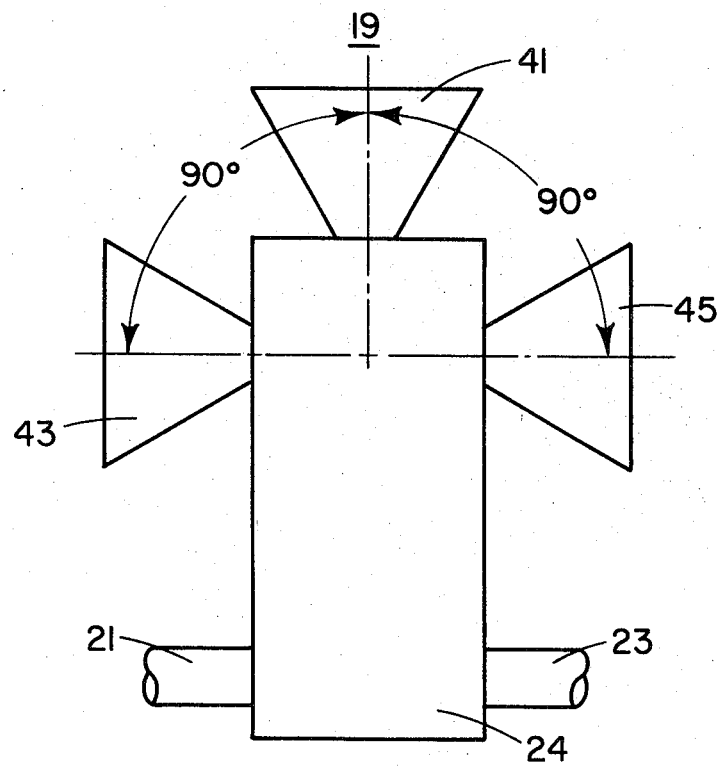
FIG. 3A shows one view of a second embodiment of a nozzle cluster having three nozzles arranged at 90° which may be used in the invention.
Figure 3B:
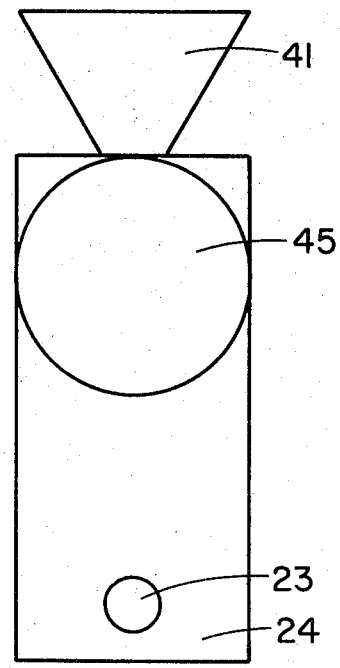
FIG. 3B shows another view of the nozzle cluster of FIG. 3A rotated by 90°.

Referring now to FIG. 3A, a second cluster arrangement is shown as having three jets 90° apart. As shown in FIG. 3A, a first jet 41 is arranged similarly as jet 31 in FIGS. 2A and 2B. However, each of the other two nozzles 43 and 45 is separated from nozzle 41 by 90°. Again, the propulsive forces of all three nozzles lie in the plane perpendicular to the direction of rotation.

Figure 4A:
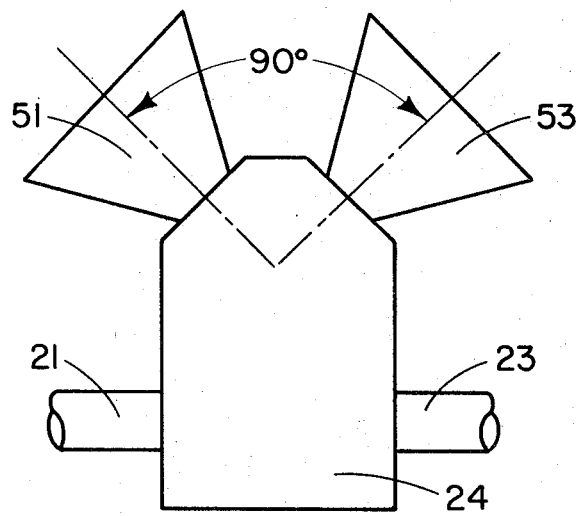
FIG. 4A shows one view of a third embodiment of a nozzle cluster having two nozzles arranged at 90° which may be used in the invention.
Figure 4B:
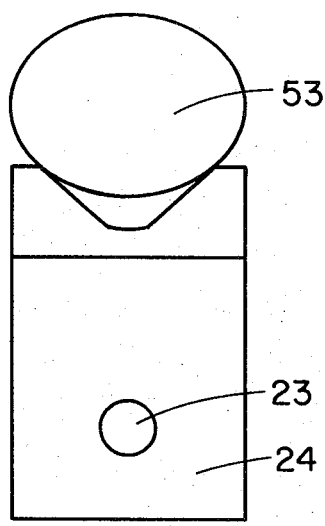
FIG. 4B shows another view of the nozzle cluster of FIG. 4A rotated by 90°.

A third embodiment is shown in FIG. 4A and 4B. In this embodiment two nozzles are separated by 90°. Nozzles 51 and 53 are separated by an angle of 90° within the plane intersecting both nozzles.

Ideally the thrust vectors of all nozzles should intersect at the center of mass of the spacecraft if translational motion is desired without concurrent rotational motion. However, so long as the rotational period of the tanks is a small fraction of the period of rotational oscillation of the spacecraft about its axes and each vector sweeps to either side of the center of mass during a rotation, then the failure to attain the ideal vector alignment can be compensated for by consecutive actuations of a nozzle during the rotational period.

Figure 5:
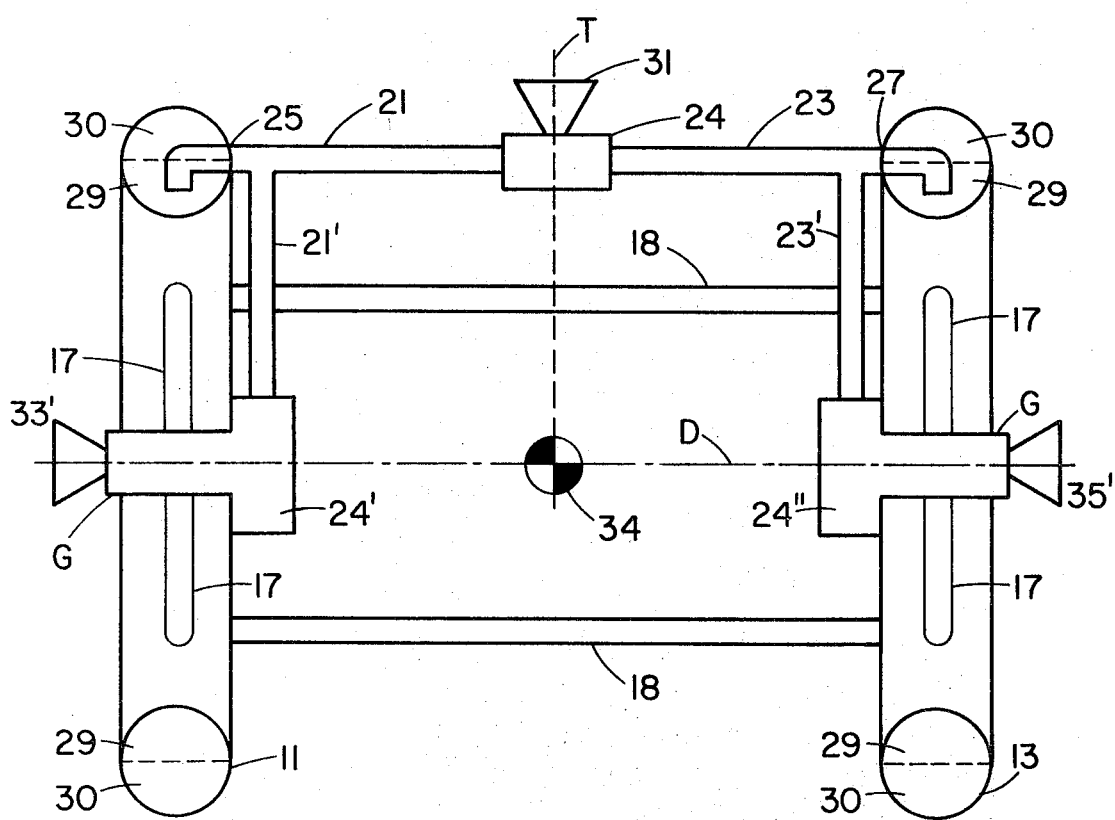
FIG. 5 shows a modification of the basic configuration of FIG. 1A with nozzles located on the axis of rotation.

Alternatively, the basic configuration shown in FIGS. 1A and 1B can be modified as shown in FIG. 5, where like numerals refer to like elements, so that all thrust vectors do pass through the center of mass of the spacecraft. The nozzle cluster 19 in this embodiment contains only the single nozzle 31 which has its thrust vector T orthogonal to the axis of rotation D. The intersection of these two axes is located at the center of mass. Each hub 15 in FIG. 1A is reconfigured to include additional plumbing and control valves 24' and 24'' and nozzles 33' and 35' as shown in FIG. 5. Conduits 21' and 23' tapped from conduits 21 and 23 respectively provide propulsive fluid to nozzles 33' and 35'. As relocated, the thrust vectors of nozzles 33' and 35' coincide with the axis of rotation D and pass through the center of mass of the spacecraft 34. Since the thrust vectors of nozzles 33' and 35' always point in the same direction with respect to the spacecraft no time phasing relative to rotation of the tanks need be observed in firing either of these nozzles. The instant of firing of nozzle 31 must be selected with respect to angular rotation, as in the other cases described, in order to apply impulse in the direction desired. This variation of the basic configuration provides economy of propellant consumption and some simplification of control logic at the expense of some increase in mechanical complexity and weight.

The altitude at which the satellite is to be used may minimize the effect of atmospheric pressure, but in all cases the satellite is exposed to solar pressures which vary with the orientation of the orbital plane with respect to the earth-sun line and the ecliptic plane and with the position of the earth with respect to the sun as in the seasons during a yearly cycle. The effect of solar pressure is to exert a force on the satellite causing the satellite to depart from a purely gravitational orbit. Furthermore, the resulting orbit undergoes variations due to the above-mentioned variations in solar pressure. Sensors and logic within the satellite are used to measure this departure from a gravitational orbit and to calculate the necessary commands to actuate the appropriate control valves supplying the nozzles so that an impulse is exerted on the satellite counter in direction and equal in magnitude to that produced by the solar and atmospheric pressure. By this means the satellite is constrained to follow a gravitational orbit in spite of disturbing forces.

The control system also must sense the angular position of the nozzle cluster and calculate the instantaneous angular position of the cluster when the nozzle must be fired so as to apply the impulse in the correct direction.

Figure 6A:
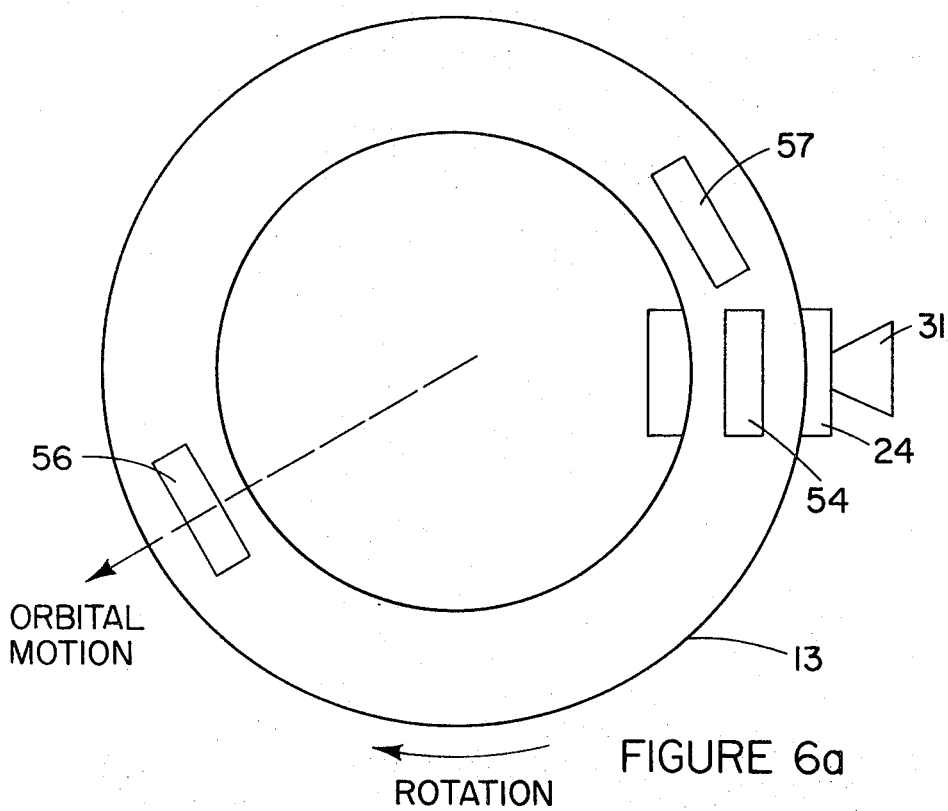
FIG. 6A shows a side view of a tank and depicts associated nozzle control apparatus.
Figure 6B:
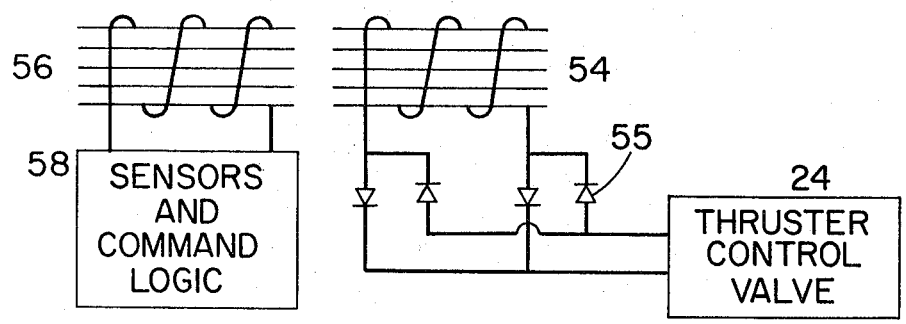
FIG. 6B is a schematic of one control circuit.

The sensing of the angular position of the rotating nozzle cluster and firing of the nozzle at the correct instant so as to apply the impulse in the desired direction can be accomplished by various methods, two of which are provided as illustrations. FIG. 6A depicts in side view the rotating toroidal tank 13, to which is attached the plumbing and thrustor control valve 24 connected to a nozzle. For simplicity, only the single nozzle 31 is shown. A schematic of the circuit is shown in FIG. 6B. Attached to the side of tank 13 is the secondary half 54 of an airgap transformer, the output of which passes through a fullwave rectifier 55 and to valve 24. Attached to nonrotating structure on the spacecraft are primary halves 56 and 57 of the air-gap transformer. The windings of these halves are connected to the sensors and command logic 58 of the spacecraft. When the sensors and command logic 58 determine that an impulse should be applied in the direction of orbital motion, as for example to overcome atmospheric drag, the winding of transformer half 56 is energized with an alternating current thrustor command signal. When the rotating transformer half 54 passes by the stationary half 56 energy is transferred across the gap, actuating the thrustor nozzle at the proper instant. Alternatively, if an impulse were required in the opposite angular position the winding of transformer half 57 would be energized. By providing more transformer halves at other angular locations the impulse can be applied in other angular positions than the two illustrated.

Figure 7:
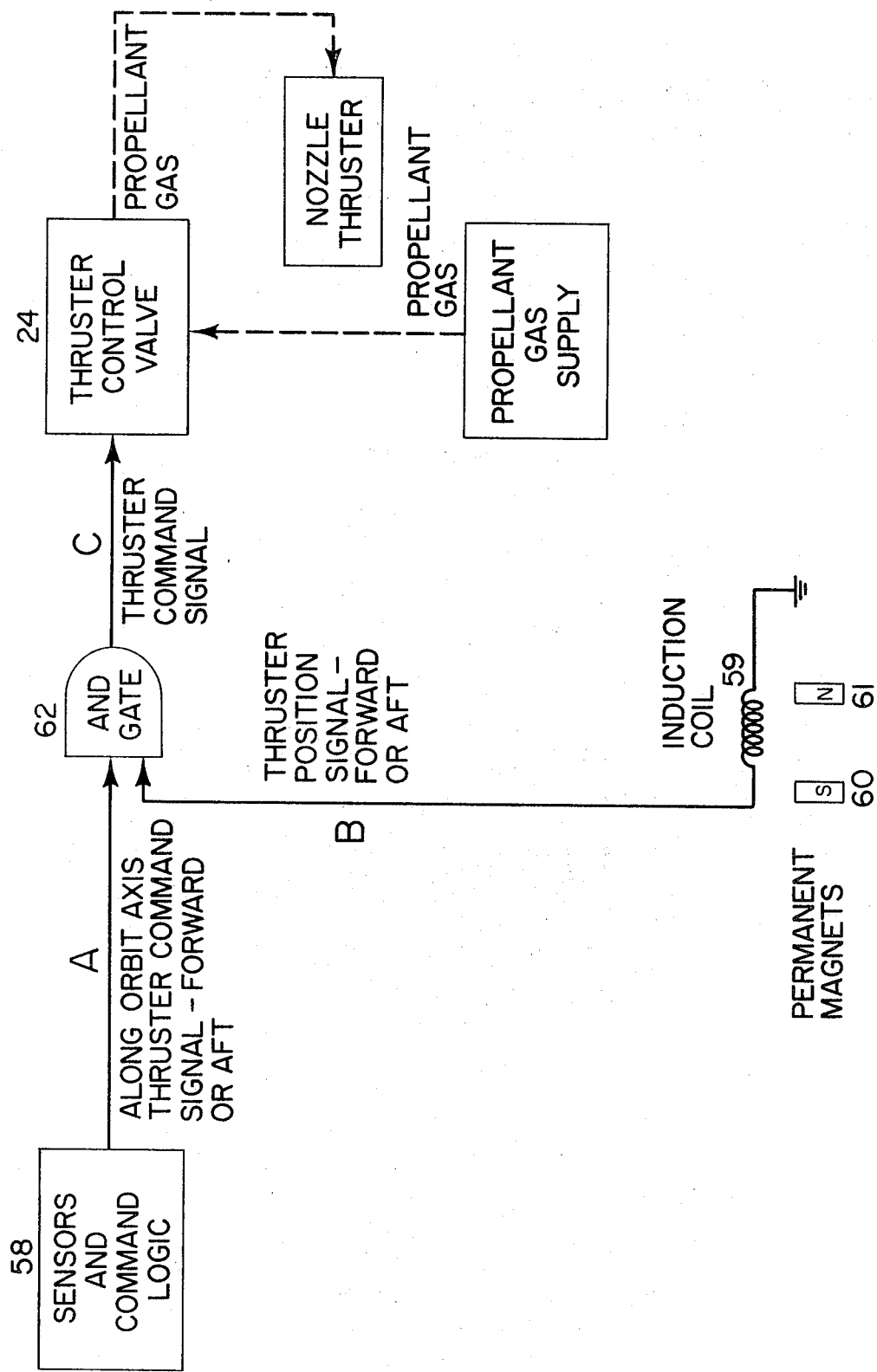
FIG. 7 is a schematic of an alternative control system.
Figure 8:
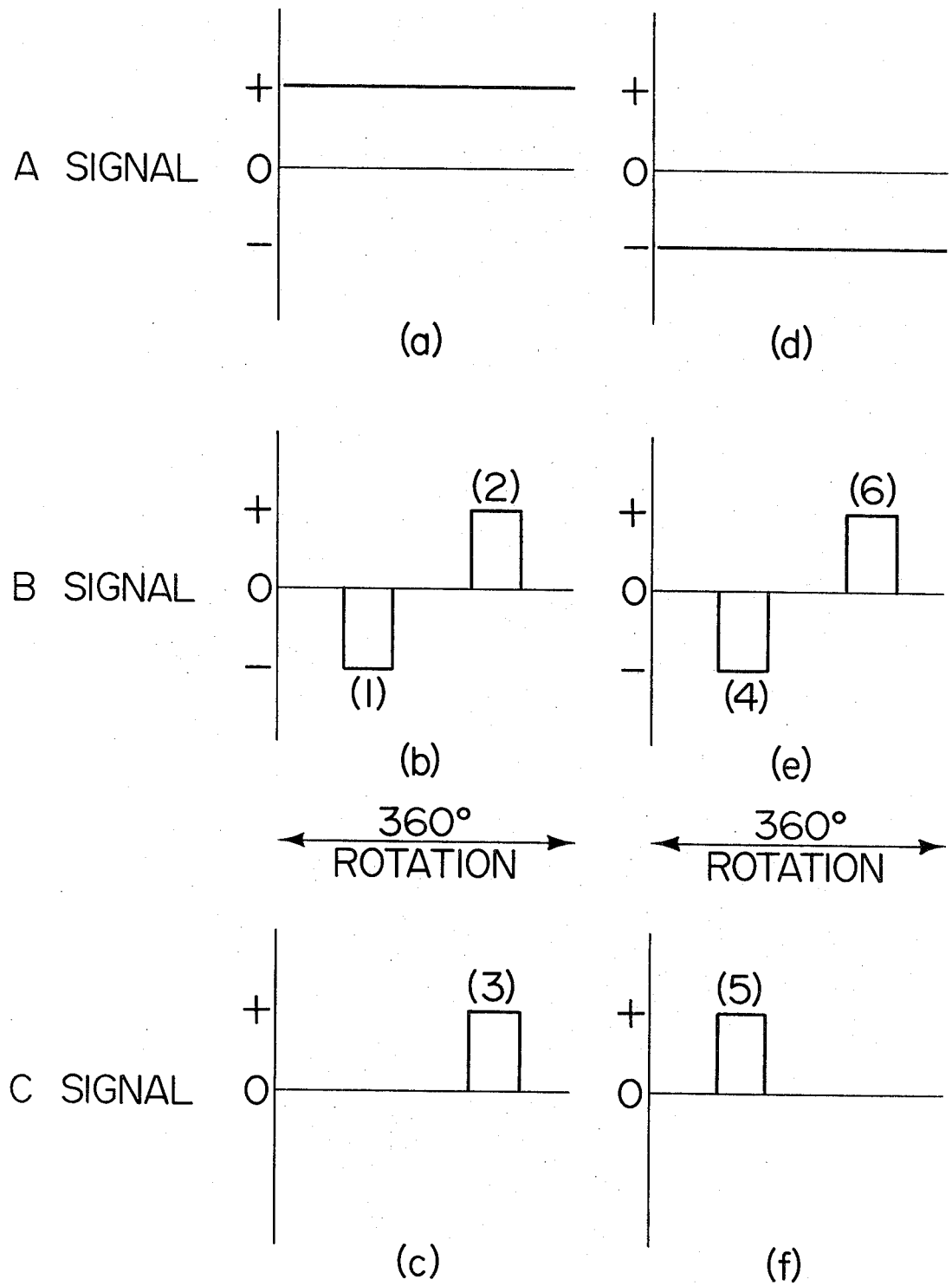
FIG. 8 (a–f) illustrates various signals in explanation of the control system of FIG. 7.

Another method of control is illustrated in FIGS. 7 and 8. An induction coil 59 is attached to tank 13 in place of transformer half 54. In place of the two stationary transformer halves there are permanent magnets, 60, and 61, one oriented to subject the coil to the field of its north pole and the other reversed. The output of the coil produced by passing the field of each magnet goes to an "AND" gate 62. The polarity of the output C depends upon which field is being traversed. The other signal into the "AND" gate is a voltage A of positive or negative polarity from the sensors and command logic 58. The polarity determines the direction of firing as illustrated in FIG. 8. The "AND" gate 62 has the property of comparing the polarity of the two signals sent to it and allowing the command to pass through to the valve 24 only if both signals have the same polarity. This property is illustrated in FIGS. 8a-8f wherein pulses (1) and (4) correspond to the polarity of the coil output caused by passing one magnet and pulses (2) and (6) the other magnet. By location of the magnets the angular position of firing is established.

As mentioned earlier, the heat required to vaporize the liquid phase is modest in amount. Likewise, so is the amount of electrical power small to dissociate suitable liquids, such as water or ammonia, in order to economize further in the consumption of stored liquid. For example, if the ammonia is dissociated into $N_2$ and $H_2$ in equilibrium with $NH_3$ vapor, the impulse of 1000 lb-sec is provided by about 85 percent as much ammonia as when used solely in the $NH_3$ vapor phase. The power consumption is about 0.13 ampere continuously at about 2 volts.

More improvement can be obtained if water is dissociated into $H_2$ and $O_2$ and subsequently ignited at the nozzle to produce a high temperature jet. In this case, about 46 percent as much weight of water is required as the weight of ammonia employed in the vapor phase. The power consumption is about 0.1 ampere continuously at possibly 2 volts.

Figure 9:
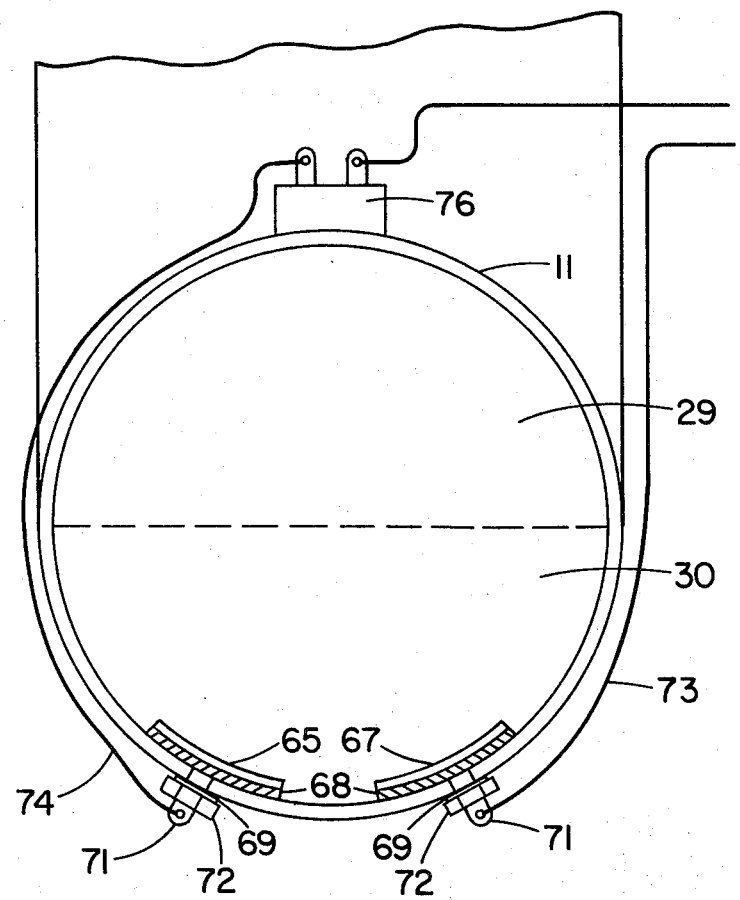
FIG. 9 illustrates apparatus for accomplishing electrochemical dissociation of the stored liquid.

A method of accomplishing electrochemical dissociation of the stored liquid phase is illustrated in FIG. 9. A portion of toroidal tank 11 is shown in cross section. Two electrodes 65 and 67 are located within the liquid phase 30. Washers 68 and 69, constructed of an electrical insulating material, provide electrical insulation of the electrodes from the tank wall and seal the apertures in the tank wall through which the terminals 71 pass. The electrodes are secured in place by nuts 72. One electrode terminal is connected to one pole of a power supply, which may be either AC or DC, by wire 73. The other terminal is connected to the other pole by wire 74 through series-connected switch 76. This is a pressure-actuated switch which measures the pressure within the tank and opens the circuit, thereby interrupting electrochemical dissociation, whenever a predetermined tank pressure occurs and reconnects the circuit whenever the pressure falls below the selected pressure.

The products of the electrochemical dissociation of liquid water stored in the toroidal tanks consists of a gaseous mixture of hydrogen and oxygen, which upon combustion within a rocket produces a specific impulse superior to that of the cold propulsion jets. This provision affords a saving in the weight of stored liquid required, at the expense of the electrical energy consumed in the dissociation process.

Figure 10:
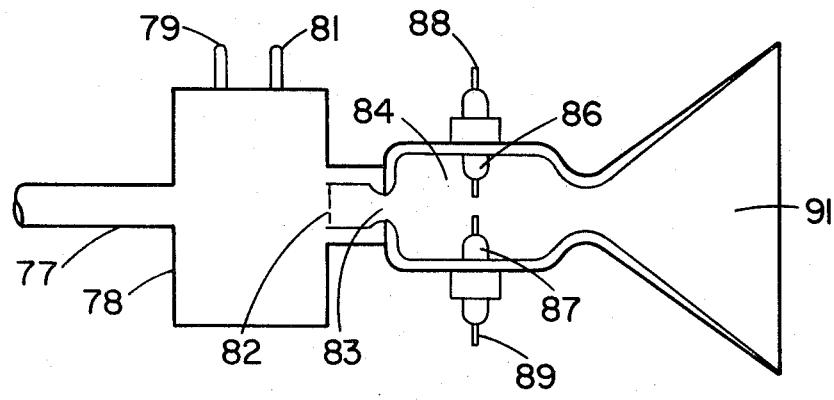
FIG. 10 illustrates a high temperature jet that may be used in conjunction with the dissociation apparatus of FIG. 9.

Since the hydrogen and oxygen mixture is highly combustible, care must be exercised to prevent spread of the combustion from the rocket chamber back into the toroidal tanks and connecting tubing. FIG. 10 illustrates a means of safely accomplishing the desired combustion rocket operation. The gas mixture is transferred from the tank through tube 77 to valve 78 which is electrically opened through connections 79 and 81 when thrust operation is desired. The gas passes through the screen 82, which is constructed of wire of good thermal conductivity and connected through paths of high thermal conductivity to the adjacent structure which conducts away any heat transferred to the screen, thereby functioning in the manner of Davy's safety lamp to prevent flame propagation. Subsequently the gas passes through the sonic orifice 83 into the rocket chamber 84. The orifice functions both as means of metering the flow rate of the gas and also as a further impediment to the propagation of flame from the rocket chamber. The gas mixture is ignited in the chamber by an electric spark discharged between the igniter electrodes 86 and 87 which are connected by wires 88 and 89 to an electric power supply (not shown). The products of combustion exhaust through the convergent-divergent supersonic nozzle 91 to produce the desired thrust.

As an alternative to rotation of the propellant tanks and the contained propellant as depicted in FIGS. 1, 2 and 5, it may be desirable to rotate only the propellant within one or more non-rotating tanks by electromagnetic pumping. Electromagnetic pumping was first widely used in nuclear reactors and is an application of Faraday's law wherein a current is passed through a conductive liquid, the liquid is subjected to a magnetic field at a right angle to the current, and the liquid moves in a direction orthogonal to the current and the field. U.S. Pat. No. 3,371,541, entitled METHOD AND APPARATUS FOR MOVEMENT OF LIQUIDS BY ELECTROMAGNETIC MEANS to H. H. Herman, Jr., Mar. 5, 1968, provides a thorough disclosure of the electromagnetic pumping referred to herein; therefore, only a brief description is presently believed necessary.

Figure 11:
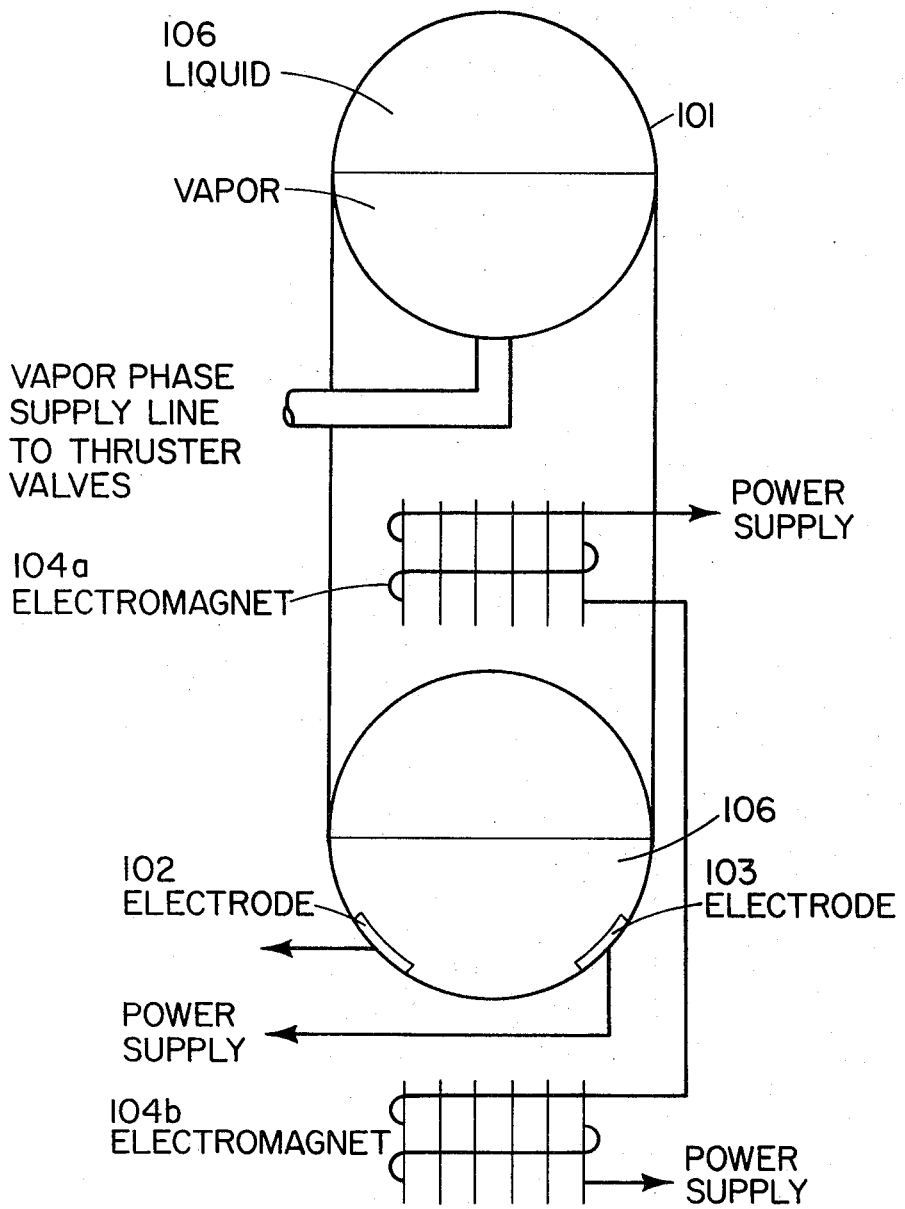
FIG. 11 illustrates an alternative embodiment of the invention wherein the tanks are fixed and electromagnetic pumping rotates the contained propellant.

Referring to FIG. 11, the tank 101, shown in cross-section, is fixed and constructed with dielectric material or alternatively of metal construction with dielectric coatings in order to minimize current leakage. Electrodes 102 and 103 pass through the tank wall in two locations. The electrical conductivity of ammonia and water, the two propellants considered herein, is satisfactory for electromagnetic pumping. By proper selection of electrode area the voltage producing electrochemical decomposition, described previously herein, may be avoided if desired. Electromagnets 104a and 104b produce a magnetic field at a right angle to the electrical path through the conductive liquid 106. Electromagnetic pumps can be constructed with either direct or alternating current and magnetic fields. The version illustrated employs an electromagnet and can be designed for either DC or AC. For a more complete discussion of the above, see FIGS. 6 and 6A and the associated description in the previously cited Herman patent.

The electromagnetically pumped variation of this invention provides some simplification by deletion of the tank driving provisions and convenience in mechanical, electrical and logic provisions. A major advantage of the electromagnetically pumped version over the rotating tank version is that the nozzles can be located remote from the tank and much greater freedom is provided for the entire configuration arrangement. Thrusts at angles intermediate to the nozzle axes are obtained by operating two or three nozzles jointly for varying time intervals. The penalty in propellant consumption from this mode of operation is slight since flight experience shows that the principal thrust requirements are along and across the orbital trajectory.

It should be understood that as in the rotating tank and fluid embodiment of the invention, electrochemical decomposition and combustion rocket modifications may also be applied to this last embodiment wherein only the propellant is rotated.

Additionally, it should be apparent that similar connecting plumbing and thruster control valves shown schematically as element 24 in FIG. 1 would be employed to discharge the propellant through associated jet clusters.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. In a spacecraft,
fluid flywheel means for providing yaw stabilization for said spacecraft and for storing jet propulsion fluid having a liquid phase and a vapor phase comprising at least one toroidal tank;
means coupled to said jet propulsion fluid stored in said fluid flywheel for providing orbital and attitude control, said means comprising nozzle cluster means coupled to the vapor phase of said jet propulsion fluid stored in said fluid flywheel means and means for controlling the discharge of said jet propulsion fluid through said nozzle cluster means;
means for rotating said jet propulsion fluid stored in said at least one tank, said stored propulsion fluid being $H_2O$, initially predominantly in the liquid phase; and electrical means for dissociating said $H_2O$ into $H_2$ and $O_2$ so as to be in equilibrium with the $H_2O$ vapor.

2. The apparatus of claim 1, including:
means provided within said nozzle cluster for igniting said $H_2$ and $O_2$ as it is discharged to produce a high temperature jet.

3. The apparatus of claim 1, wherein:
said spacecraft comprises two tanks, each tank having a hub;
said nozzle cluster means is spaced equally between said tanks and includes a single nozzle oriented so that its propulsive force is within the plane of rotation of said cluster and in a vector direction intersecting the axis of rotation of said tanks and the center of mass of said spacecraft; and further including:
second and third nozzles respectively located at said hubs of said tanks and oriented so that their respective thrust vectors are opposite in direction and coincide with said axis of rotation of said tanks.

4. The apparatus of claim 1, wherein said control means includes:
means for producing a localized magnetic field, said magnetic field means being stationary with respect to said at least one rotating tank and positioned adjacent said tank at a predetermined angular location with respect to the axis of rotation of said tank;
responsive means attached to said at least one tank and responsive to said localized magnetic field for producing a signal to cause said propulsion fluid to discharge through said nozzle cluster means, said fluid discharge producing a propulsive force in a direction corresponding to said angular position of said stationary magnetic field means.

5. The apparatus of claim 4, wherein:
said nozzle cluster means is coupled to said jet propulsion fluid stored in said fluid flywheel means by conduits;
said conduits including control valve means actuated by said signal from said responsive means to discharge said propulsion fluid through said nozzle cluster means.

6. The apparatus of claim 4, wherein:
said stationary magnetic field means comprises the primary half of air-gap transformer; and
said rotating responsive means comprises the secondary half of said air-gap transformer;
said stationary primary being energized by a command signal and said rotating secondary producing said signal by induction when it passes by said energized primary.

7. The apparatus of claim 6, including:
a plurality of stationary primary halves of an air-gap transformer positioned at different predetermined angular positions with respect to said axis of rotation of said tank; and
each primary half being capable of being energized independently by a command signal.

8. The apparatus of claim 4, wherein:
said stationary magnetic field means comprises a permanent magnet;
said rotating responsive means comprises an induction coil;
said coil producing an induced signal when it passes by said permanent magnet; and further including:
an AND gate;
said AND gate having a first input from said induction coil and a second input from a command signal source and being effective to produce said signal for permitting said propulsion fluid to discharge through said nozzle cluster means upon a concurrence of signals from said first and second inputs.

9. The apparatus of claim 8, including:

two stationary permanent magnets oriented to subject said induction coil to opposite magnetic fields, said magnets positioned at different predetermined angles with respect to the axis of rotation of said tank;

said command signal source being capable of producing a signal of either polarity;

wherein said AND gate compares the polarity of said first and second input and produces said signal for permitting said propulsion fluid to discharge through said nozzle cluster means only when said first and second signal are of the same polarity.

* * * * *